United States Patent [19]

Yato et al.

[11] Patent Number: 4,985,183

[45] Date of Patent: Jan. 15, 1991

[54] UO2 PELLET FABRICATION PROCESS

[75] Inventors: Tadao Yato, Mito; Hiroshi Tanaka, Omiya, both of Japan

[73] Assignee: Mitsubishi Metal Corporation, Tokyo, Japan

[21] Appl. No.: 375,881

[22] Filed: Jul. 6, 1989

[30] Foreign Application Priority Data

Dec. 27, 1988 [JP] Japan .................. 63-330340

[51] Int. Cl.$^5$ .............................. G21C 21/00
[52] U.S. Cl. ........................ 264/0.5; 264/125; 264/59; 252/138; 376/901
[58] Field of Search .............. 264/0.5, 125, 59; 252/638; 423/261; 376/901

[56] References Cited

U.S. PATENT DOCUMENTS

| | | | |
|---|---|---|---|
| 4,061,700 | 12/1977 | Gallivan | 264/0.5 |
| 4,138,360 | 2/1979 | Gallivan | 252/301.1 |
| 4,383,953 | 5/1983 | Larson et al. | 264/0.5 |
| 4,572,810 | 2/1986 | LeBlanc, Jr. | 264/0.5 |
| 4,869,866 | 9/1989 | Lay et al. | 376/421 |
| 4,869,867 | 9/1989 | Lay et al. | 376/421 |
| 4,869,868 | 9/1989 | Lay et al. | 376/421 |

*Primary Examiner*—Stephen J. Lechert, Jr.
*Assistant Examiner*—Nina Bhat
*Attorney, Agent, or Firm*—Oblon, Spivak, McClelland, Maier & Neustadt

[57] ABSTRACT

There is disclosed a process for fabricating UO$_2$ pellets from highly active uranium dioxide powders, comprising the steps of (1) uniformly adding at least one pore-former agent in the range of 0.3 to 1.4% by weight to uranium dioxide powders as a starting material, the pore-former agent decomposing and sublimating below 600° C. and having an average particle size in the range of 5 to 500 $\mu$m, (2) compacting the uranium dioxide powders including the pore-former agent to form green pellets, and (3) sintering the green pellets to form sintered UO$_2$ pellets having large grain size crystals. According to the present invention, UO$_2$ pellets having the sintered density in the range of 94 to 97% TD are fabricated from highly active UO$_2$ powder when the pellets have large crystalline grain sizes exceeding 20 $\mu$m. Accordingly, the fission gasses generated during irradiation is restrained to the inside pellet thereof to enhance the safety of the irradiation.

11 Claims, No Drawings

UO2 PELLET FABRICATION PROCESS

BACKGROUND OF THE INVENTION

The present invention relates to a process for fabricating nuclear reactor fuel pellets having large grain sizes from highly active $UO_2$ powder. In particular, the present invention concerns a method for controlling the sintered density of $UO_2$ pellets to a predetermined range.

When $UO_2$ pellets are used as the fuel in nuclear reactors, it is important that the fuel density be high within a reasonable limit so that a more compact reactor core can be designed, and that the thermal conductivity of the pellets is sufficiently high.

However, when the sintered density of the pellets is too high, swelling of the pellets during irradiation becomes too great, thereby damaging a tube in the reactor. Accordingly, $UO_2$ pellets commonly used in light-water reactors are usually designed so that the sintered density is in the range of from 94 to 97% TD (theoretical density).

One recent technical innovation is to prolong the useful life of the reactor fuel. This is called the plan for "high burnup", and it is now being studied seriously. In order to execute this plan, it is imperative to restrain the fission gas (FP gas) in the pellets as much as possible.

It is well known that producing large crystal grain sizes is effective in confining FP gas in the pellets. However, the conventional technology only produced grain sizes of at most about 10 to 20 $\mu$m.

In light of the above, the applicants have proposed a process for fabricating $UO_2$ pellets with large-grain size crystals in JP-A-62-297215, JP-A-63-45127, U.S. patent application Ser. Nos. 139447, 296802 and 296808. These processes have a common effect of producing in that they make crystalline grains of large size by controlling the conditions of ammonium diuranate (ADU) formation.

With the processes described in the applications and patents, it is possible to control the crystalline grain size, however at the time these previous patents were filed, the applicants did not consider to control the sintered density of the pellets. In other words, when pellets are fabricated pellets having grain sizes larger than 20 $\mu$m by the process described above, the sintered density of the resulting pellets are as high as 98 to 99% TD.

In order to reduce the sintered density of the sintered body, if required, it has been common to add a pore-former agent to the raw material powder, which cause the formation of pores when the agent sublimates during sintering. The applicants believe that the method is applicable to the fabrication process for pellets composed of large-grain size crystals. Although a pore-former agent of this kind is effective in reducing the sintered density, the agent is likely to have adverse effects on $UO_2$ grain growth. In other words, the formation of crystalline grains with large grain size is disrupted. Accordingly, it is desired to develop a method for controlling both the sintered density of the pellets and the crystalline grain sizes.

SUMMARY OF THE INVENTION

Accordingly, it is an object of the present invention to provide a process for fabricating $UO_2$ pellets having the sintered density of pellets within the range of from 94 to 97% TD, when pellets having large crystalline grain sizes in excess of 20 $\mu$m are fabricated from highly active $UO_2$ powder, and thereby restrain the fission gasses generated during the irradiation in the pellets thereof to enhance the safety of irradiation.

According to an aspect of the present invention, there is provided a process for fabricating $UO_2$ pellets comprising (1) uniformly adding at least one pore-former agent in the range of 0.3 to 1.4% by weight, to uranium dioxide powders to form a starting material, the pore-former agent decomposing and sublimating below 600° C. and having average grain size in the range of 5 to 500 $\mu$m, (2) compacting the uranium dioxide powders, including the pore-former agent, to form green pellets, and (3) sintering the green pellets to form sintered $UO_2$ pellets having large grain-size crystals.

According to the present invention, Accordingly, both the sintered density of the pellets and the crystalline grain sizes can be easily controlled to the desired range, which was not previously possible.

DETAILED DESCRIPTION

A process for fabricating $UO_2$ pellets, according to the present invention, will be specifically described below.

First, a pore-former agent is added to highly active $UO_2$ powder. From experimental results, the inventors have determined that the following conditions must be met in order to maintain a sintered density in the range between 94 to 97% TD.

(1) It is necessary that the particle size of the pore-former agent be between 5 and 500 $\mu$m, and preferably between 10 and 100 $\mu$m. When the particle size is less than 5 $\mu$m, the pores left behind after the sublimation of the agent during sintering disrupted the growth of the crystals, and thus, the crystalline grain sizes in the pellets is small. On the other hand, when the particle size exceeds 500 $\mu$m, large pores are formed on the surface of pellets. These large pores must be avoided because they accelerate the absorption of the water into the pellets.

(2) It is necessary to use a pore-former agent that decomposes and sublimates below 600° C., more preferably at 500° C. When the decomposition temperature is higher than 600° C., the pore-former agent is confined to the inside of the pellets during the sintering process and cracks or holes appear in the pellets. Ammonium acetate, ammonium carbonate, ammonium bicarbonate, ammonium oxalate, ammonium alginate, stearic acid, and the like, are pore-former agents that meet the above requirements. These compounds are used either alone or in a mixture.

(3) The appropriate amount of these pore-former agent is in the range of 0.3 to 1.4% by weight of the $UO_2$ powders. The sintered density of the pellet will not be in the range of 94 to 97% TD, when the added amount falls outside this range. Subsequently, $UO_2$ powder, to which a pore-former agent has been added, is fabricated into pellets by any of the methods described below.

(a) $UO_2$ powder, to which a pore-former agent has been added, is filled into a mold and pressed to make a pressed body.

(b) A lubricant is added uniformly to $UO_2$ powder to which a pore-former agent has been added. Thus prepared, the powder is filled into a mold and subjected to compacting.

(c) UO₂ powder, to which a pore-former agent has been added, is filled into a mold coated with a lubricant. Subsequently, the compacting step is carried out on the filled mold.

(d) UO₂ powder that includes a pore-former agent is roughly molded into a lump which is pulverized to obtain granules. The granules are compacted by any of the processes described in (a) to (c) above. Stearic acid, zinc stearate, lithium stearate, stearic amide, ethylene-bis-stearic amide, methylene-bis-stearic amide, polyethylene glycol, and the like, are suitable compounds for the lubricant. These compounds are used either alone or in mixtures. When a lubricant of this kind is added to the raw material powder, or when a lubricant is applied to the mold, the press-compacting is easily carried out.

When the granules are made by the method described in (d), the size of the granules should be less than 2000 μm, and more preferably less than 1000 μm. When the size exceeds 2000 μm, it is difficult to fill a designated amount of the granule into a mold and perform the compacting step.

the lubricant, respectively. The pressed body was heated to 1750° C. for four hours in hydrogen atmosphere to produce sintered pellets. Table 1 shows the relationship between pellets fabrication conditions and physical properties of the pellets.

As is clearly seen from Table 1, the pellets fabricated by the processes according to the present invention have a sintered density between 94 and 97% TD. Furthermore, significant reduction of the crystalline grain size, and reduced probability of having large pores, both due to the presence of a pore-former agent, is apparent.

TABLE 1

| No. | Pore-Former Agent Particle Size (μm) | Pore-Former Agent Addition (wt. %) | Fabrication Process Granulation (μm) | Fabrication Process Lubricant | Physical Properties of Pellets Open Porosity | Physical Properties of Pellets Density (% TD) | Physical Properties of Pellets Grain Size (μm) | Overall Evaluation |
|---|---|---|---|---|---|---|---|---|
| A-1 | 5–10 | 1.0 | None | Mold Coated | Small | 95.3 | 45.4 | Excellent |
| A-2 | 10–100 | " | " | Mold Coated | " | 95.6 | 50.6 | " |
| A-3 | 100–1000 | " | " | Mold Coated | " | 95.4 | 49.8 | " |
| A-4 | 10–100 | 0.3 | " | Mold Coated | " | 97.4 | 51.3 | " |
| A-5 | " | 0.8 | " | Mold Coated | " | 95.9 | 50.5 | " |
| A-6 | " | 1.4 | " | Mold Coated | " | 94.0 | 50.9 | " |
| A-7 | " | 1.0 | " | None | " | 95.5 | 49.6 | " |
| A-8 | " | " | " | Mixing Powders | " | 94.9 | 45.2 | " |
| A-9 | " | " | less than 2000 | None | " | 95.3 | 50.1 | " |
| A-10 | " | " | less than 2000 | Mold Coated | " | 95.4 | 51.8 | " |
| A-11 | " | " | less than 2000 | Mixing Powders | " | 94.8 | 46.4 | " |
| B-1 | — | 0 | None | Mold Coated | Small | 99.3 | 50.3 | High density |
| B-2 | less than 5 | 1.0 | " | Mold Coated | " | 95.4 | 37.9 | Significant Reduction of Grain Size |
| B-3 | 500–1000 | " | " | Mold Coated | Large | 95.0 | 51.2 | Large open porosity |
| B-4 | 10–100 | 0.2 | " | Mold Coated | Small | 98.0 | 48.9 | High density |
| B-5 | " | 1.5 | " | Mold Coated | " | 93.4 | 49.2 | Lower density |

EXAMPLES

The following examples are cited to prove the usefulness of the invention.

EXAMPLE 1

ADU (ammonium diuranate), produced by the reaction between 300 gU/l of UO₂F₂ aqueous solution and aqueous ammonia, was calcined and reduced to form UO₂ powder. After 0 to 1.5% by weight of pore-former agents, whose particle size had been adjusted to several different particle sizes, was uniformly added to the UO₂ powder, the pressed bodies were formed under the pressure of 3 t/cm² by the use of various compacting processes as described above. Ammonium oxalate and zinc stearate were selected as the pore-former agent and

EXAMPLE 2

One or more compounds were selected as pore-former agents from the group consisting of ammonium acetate (C 1), ammonium carbonate (C 2), ammonium bicarbonate (C 3), ammonium oxalate (C 4), ammonium alginate (C 5) and stearic acid (C 6). 1.0% by weight of the selected compound or mixture thereof was added to the same UO₂ powder as in Example 1. The resulting UO₂ powder was subjected to rough compacting, pulverization and granulation to form granules. Subsequently, one or more compounds were selected as a lubricant from the group consisting of stearic acid (D 1), zinc stearate (D 2), lithium stearate (D 3), stearic amide (D 4), ethylene-bis-stearic amide (D 5), methylene-bis-stearic amide (D 6) and polyethylene glycol (D 7), and 0.2% by weight of the selected compound or compounds was added to the granules to make the mixture. Furthermore, the mixture was subjected to the same compacting and sintering as in Example 1 to form pellets. Table 2 shows the relationships between the fabrication conditions of pellets and the physical properties of the pellets.

As is clearly seen from Table 2, the pellets having the excellent physical properties are fabricated by using the above-described pore-former agents and lubricants in the process according to the present invention.

TABLE 2

| Pore-Former Agent | Lubricant | Grain Size of Pellets ($\mu$m) |
|---|---|---|
| C 1 | D 2 | 50.2 |
| C 2 | " | 48.6 |
| C 3 | " | 49.3 |
| C 4 | " | 52.9 |
| C 5 | " | 49.4 |
| C 6 | " | 51.1 |
| C 1 + C 4 | " | 49.5 |
| C 1 + C 2 + C 4 | " | 48.3 |
| C 1 + C 2 + C 3 + C 4 | " | 49.9 |
| C 1 + C 2 + C 3 + C 4 + C 5 | " | 49.7 |
| C 4 | D 1 | 51.3 |
| " | D 3 | 50.4 |
| " | D 4 | 48.5 |
| " | D 5 | 51.1 |
| " | D 6 | 49.7 |
| " | D 7 | 50.3 |
| " | D 1 + D 2 | 50.5 |
| " | D 1 + D 2 + D 3 | 49.8 |
| " | D 1 + D 2 + D 3 + D 4 | 50.9 |
| " | D 1 + D 2 + D 3 + D 4 + D 5 | 52.2 |
| " | D 1 + D 2 + D 3 + D 4 + D 5 + D 6 | 50.5 |
| " | D 1 + D 2 + D 3 + D 4 + D 5 + D 6 + D 7 | 49.8 |

What is claimed is:

1. A process for fabricating uranium dioxide ($UO_2$) pellets from highly active uranium dioxide powders, comprising:
   (1) uniformly adding at least one pore-former agent in the range of 0.3 to 1.4% by weight to uranium dioxide powders as a starting material, the pore-former agent decomposing and sublimating below 600° C. and having an average particle size in the range of 5 to 500 microns,
   (2) compacting the uranium dioxide powders including the pore-former agent to form green pellets, and
   (3) sintering the green pellets to form sintered $UO_2$ pellets having an average crystalline grain size larger than 20 microns.

2. A process for fabricating $UO_2$ pellets as claimed in claim 1, wherein the compacting step is performed after at least one lubricant is added to the uranium dioxide powders including the pore-former agent.

3. A process for fabricating $UO_2$ pellets as claimed in claim 1, wherein the compacting step is performed after inner surfaces of a mold are coated with at least one lubricant.

4. A process for fabricating $UO_2$ pellets as claimed in claim 1, wherein the uranium dioxide powders including the pore-former agent are subjected to rough compacting and pulverization to form granules having particle sizes less than 2000 $\mu$m, and the granules are subjected to compacting.

5. A process for fabricating $UO_2$ pellets as claimed in claim 4, wherein the compacting is performed after at least one lubricant is uniformly added to the granules.

6. A process for fabricating $UO_2$ pellets as claimed in claim 4, wherein the compacting is performed after the granules are filled into a mold whose inner surfaces is coated with at least one lubricant.

7. A process for fabricating $UO_2$ pellets as claimed in claim 1, wherein at least one pore-former agent is selected from the group consisting of ammonium acetate, ammonium carbonate, ammonium bicarbonate, ammonium oxalate, ammonium alginate and stearic acid.

8. A process for fabricating $UO_2$ pellets as claimed in claim 1, wherein at least one of the lubricants is selected from the group consisting of stearic acid, zinc stearate, lithium stearate, stearic amide, ethylene-bis-stearic amide and polyethylene glycol.

9. A process for fabricating $UO_2$ pellets as claimed in claim 1, wherein said sintered pellets have a sintered density in the range between 94 to 97 percent of the theoretical density.

10. A process for fabricating $UO_2$ pellets as claimed in claim 1, wherein said pore-former agent has a particle size between 10 and 100 microns.

11. A process for fabricating $UO_2$ pellets as claimed in claim 4, wherein said granules have particle sizes less than 1000 microns.

* * * * *